Aug. 18, 1970    E. B. NEITZEL    3,525,092
COMPUTER DRIVEN CRT RECORDING SYSTEM
Filed Dec. 30, 1966    3 Sheets-Sheet 1

INVENTOR
EDWIN B. NEITZEL
ATTORNEY

United States Patent Office 3,525,092
Patented Aug. 18, 1970

3,525,092
COMPUTER DRIVEN CRT RECORDING SYSTEM
Edwin B. Neitzel, Dallas, Tex., assignor to Texas Instruments Incorporated, Dallas, Tex., a corporation of Delaware
Filed Dec. 30, 1966, Ser. No. 606,281
Int. Cl. G01v 1/24; G05b 15/00
U.S. Cl. 340—324                              6 Claims

ABSTRACT OF THE DISCLOSURE

A computer operated controller unit selectively applies analog seismic signals to a high resolution cathode ray tube along with information superimposed thereon from a flying spot scanner with a digitally programmed subraster scan to provide multiple symbol annotation. A camera viewing the cathode ray tube provides for a permanent storage of data applied to cathode ray tube.

FIELD OF THE INVENTION

This invention relates to an on line information display and more particularly to computer controlled cathode ray tube display of seismic traces and annotating means related thereto.

THE PRIOR ART

Historically, data display for seismic exploration has been characterized by the use of the multichannel galvanometric produced oscillographic cameas. To produce a cross-section presentation the paper records would be taped together.

More recently, rotating drum cameras or section plotters have been developed. The latter instruments provide more precise timing alignment of records on one piece of paper or film. To provide more of a facsimile type of presentation various innovations in display are employed. Over a period of years, oscillographic wiggle line, variable intensity (facsimile type), variable area, combination of wiggle line and variable area, and combination of wiggle line and variable intensity types of presentations became standard in the seismic exploration industry.

Section plotter cameas have two significant disadvantages. They are low production devices and have fixed timing scales. Normally, such a system operates at a timing scale to produce records of either 7.5 or 10.0 inches per second.

As part of the display system, simple geometric corrections have been incorporated into the section plotter systems. Both static and NMO corrections generally have been accomplished. Means for carrying out simple analog processes, such as stacking, have been added to the systems. Use of digital computers for seismic data processing introduced two significant requirements for data display, i.e.: high production and increased flexibility. To realize both of these requirements, a multimode strip camera has been used for the basic display.

However, there remained the requirement for better quality display and precise timing for seismic analog tape to digital transcriptions. Still more recent systems which are completely automatic for plotting a record section require manual control of the setup for the hundreds of different modes of operation. Setup time and the requirement for skilled operators therefore presented the major system disadvantages.

Representative of prior art systems are those systems disclosed in U.S. Pats. 2,825,886 to Pittman, 2,912,673 to Groenendyke, 2,991,446 to Loper, and 3,105,220 to Groenendyke.

SUMMARY

In accordance with the present invention, a multimode recording system is provided under digital control wherein a cathode ray tube has an input channel for receiving successive seismic traces as a whole with means for writing such traces side by side sequentially while in a first mode. Annotation signal generating means are applied to the display means with the system in a second mode to apply annotations to the display. Selector means are provided for placing the system in the desired mode. Preferably, the display means is a high resolution cathode ray tube cooperating with the precision camera for exposing a film by light emanating from the display. Preferably a visual monitor is provided for flicker-free exhibition of the signals received by the camera.

THE DRAWINGS

For a more complete understanding of the present invention and for further objects and advantages thereof, reference may now be had to the following description taken in conjunction with the accompanying drawings in which.

THE PREFERRED EMBODIMENTS

Figure 1:
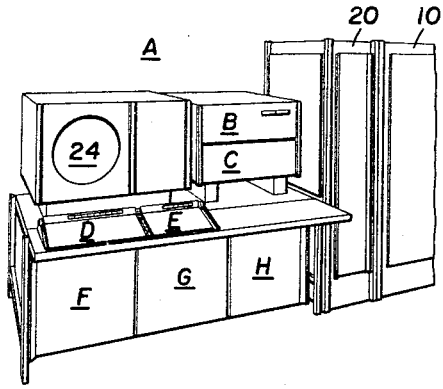
FIG. 1 is a perspective view of an embodiment of the invention.

In FIG. 1 an embodiment of the invention has been illustrated wherein the recording system comprises a console unit A which is operated in response to signals from a digital computer system 10. The console A includes a cathode ray monitor screen presentation 24, a flying spot scanner annotation symbol signal generator 20 and a pair of photographic units B and C, each of which, as will hereinafter be described, includes a high resolution CRT unit and a motor driven camera. The console unit A also includes suitable control panels D and E and associated power supply and control compartments F, G, and H.

Figure 2:
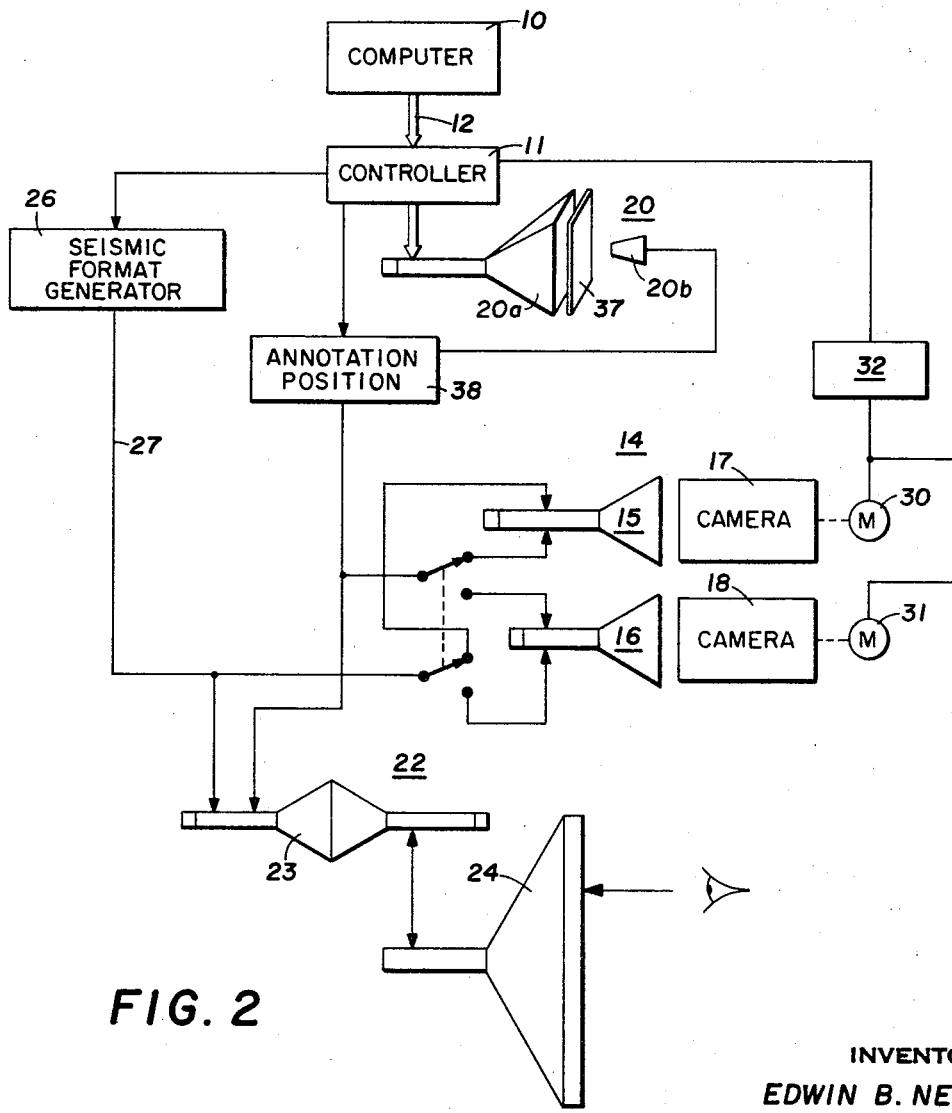
FIG. 2 is a block diagram illustrating complements of the invention.

In FIG. 2 the computer 10 is employed to control a recording system. A controller 11 receives digital data and instructions by way of channels 12 from computer 10 for the control of three primary units. The first unit is a recording unit 14 which includes a pair of high resolution cathode ray tubes 15 and 16, each of which has a camera associated therewith such as cameras 17 and 18.

The second unit is an annotation signal generator 20 which is employed to produce legend information on tubes 15 and 16.

The third unit is a storage tube monitor display system 22 including a storage tube 23 and a monitor display tube 24.

Seismic data signals from controller 11 are applied to a seismic format generator 26, the output of which is applied as by way of channel 27 to either or both of the cathode ray tubes 15 and 16 and the storage tube 23.

The object of this system is to receive data from computer 10 and to process the same for producing an ultimate array of data on the face of tubes 15 and/or 16 where the array is then photographed by means of cameras 17 and 18. In intervals between the appearance of data signals, the system is then changed to operate in a different mode to provide time lines and annotation signals to the tubes 15 and 16. Two display tubes 15 and 16 are employed to permit the continuous acquisition and recording of data even though one of the units requires shut down for change of film and so forth.

The cameras 17 and 18 are provided with control motors 30 and 31, respectively. The motors are provided for moving the film in camera 17 and 18 in synchronism with the recording of data. The motors 30 and 31 are controlled by unit 32 which determines the size of steps the film is moved.

The monitor unit 22 is provided with a conventional scan converter tube 23 to provide a flicker-free presentation on tube 24 of data in the array on cameras 15 and 16.

The annotation symbol generator 20 includes a flying spot scanner operating with an annotation symbol mask 37 for selection of any one of a plurality of symbols to be applied in the data array on the tubes 15 and 16. The symbols will be presented at positions dependent upon the operation of an annotation position control unit 38.

Figure 3:
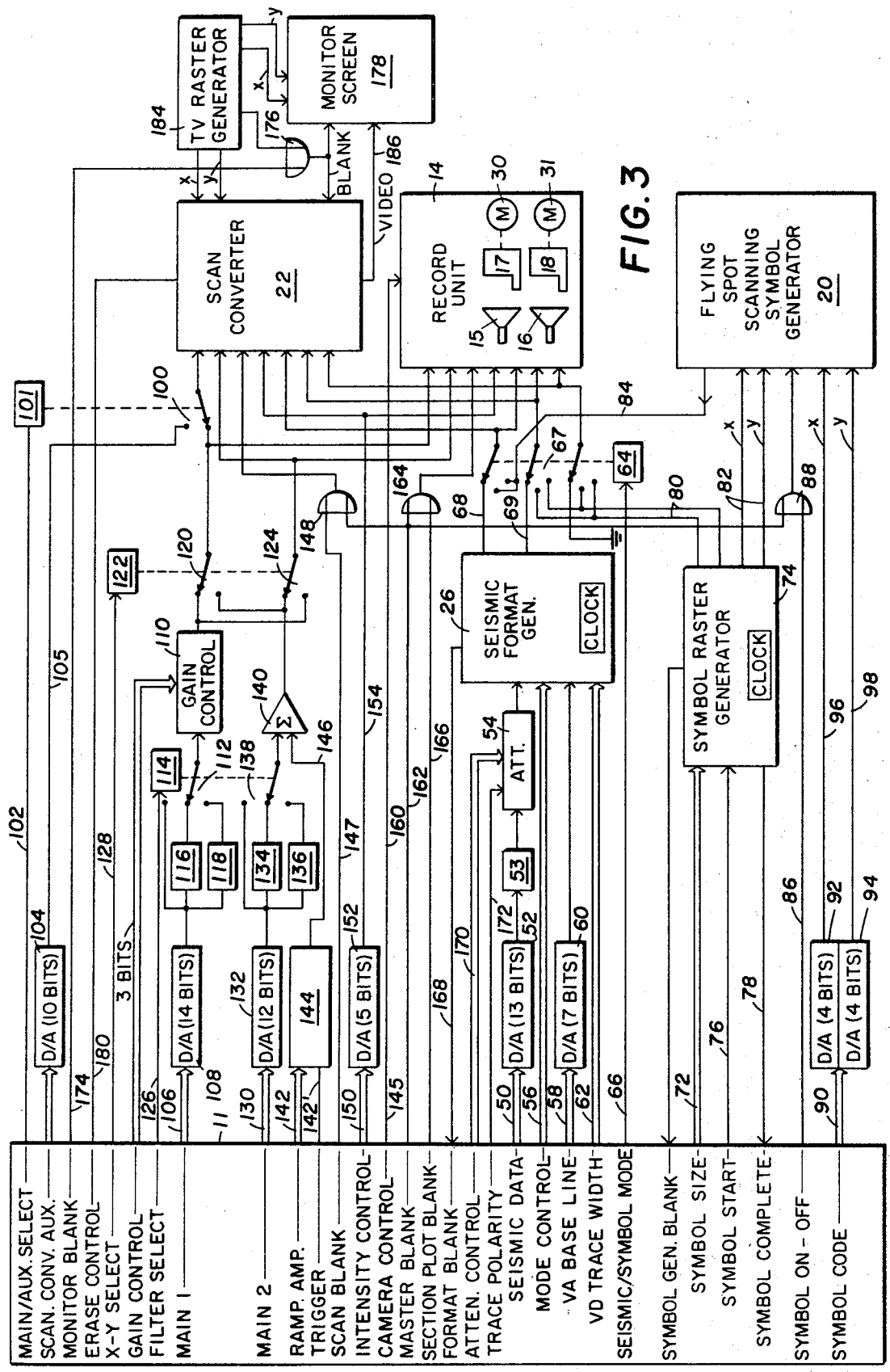
FIG. 3 is a more detailed diagram illustrating the invention.

In FIG. 3 seismic data words, in digitized form, are applied by way of channel 50 to a digital/analog converter 52, the output of which is applied by way of a smoothing filter 53 and an attenuation control unit 54 to the format generator 26.

A three-bit data word is applied by way of channel 56 for control of the mode of operation of the format generator 26.

The system has five operating modes as follows:

Mode 1—seismic plots;
Mode 2—annotation;
Mode 3—grid line plotting;
Mode 4—general plotting; and
Mode 5—film positioning.

In Mode 1 seismic traces may be displayed on the high resolution tubes 15 and 16 in unit 14 in any one of a plurality of different formats including wiggle trace, variable area, variable density, or combinations of wiggle trace and variable area. The base line of a variable area display is controlled by a digital signal on channel 58 which is converted by D/A converter 60, the output of which is applied to the format generator 26. A variable density trace width signal is applied by way of channel 62 to the generator 26.

A switch actuator 64 operates in dependence upon the control signals supplied by way of channel 66. In its upper position, the triple pole, triple throw switch 67 applies video intensity modulating signals on channel 68 to units 14 and 22 and an x deflection voltage on line 69 to units 14 and 22.

Two-bit words applied by way of channels 72 to a symbol raster generator control the size of the raster and thus the size of the symbols. Any one of four different symbol sizes may thus be selected by application of the proper coded word on channel 72. A raster start signal appears on channel 76. A symbol complete signal appears on channel 78.

The output of the symbol raster generator is applied by way of channels 80 to switch 67 and thence to units 14 and 22. The output is applied by way of channels 82 to the symbol generator unit 20. The output of the symbol generator unit 20 is applied by way of channel 84 to the second and third terminals of the upper section of switch 67 and by this means to units 14 and 22.

An on-off voltage state is applied by way of channel 86 and AND gate 88 to the symbol generator 20.

A symbol code signal is applied by way of channels 90 to D/A converters 92 and 94. The outputs thereof are applied to the symbol generator 20 by way of channels 96 and 98. The voltage on channel 96 controls the x position of the raster generated by unit 74 and the voltage on channel 98 controls the y position of the rester.

The scan converter 22 has an input channel control switch 100 which is actuated by an operator 101 under the control of a signal on line 102. In the upper position of switch 101 a scan converter auxiliary signal is applied by way of a D/A converter 104 and channel 105 to the scan converter 122. In this operation the computer program can slave the trace position on the monitor when the film is incrementally stepped between traces or groups of traces on the high resolution CRT. In the lower position the main seismic time sweep signal applied by way of channel 106 and D/A converter 108 and gain control unit 110 is then applied to the scan converter unit.

On the input of the gain control unit 110 is a three channel switch 112 operated under control of an operator 114. In the upper position the output of converter 108 is applied to the control unit 110 without filtering or smoothing. In the second position, a high frequency filter 116 operating to smooth the 32 kc. data rate is inserted in the circuit between converter 108 and 110. In the bottom position the low frequency filter operating on the 16 kc. data rate is included in the channel.

The output of the unit 110 is applied to the scan converter 22 by way of a switch 120 when in its upper position. Switch 120 is operated under the control of an operator 122 and which also controls a second switch 124. The output of the gain control unit 110 is connected to the bottom terminal of switch 124.

Operator 114 is controlled by a filter select voltage on channel 126. Operator 122 is actuated under control of voltage on the x–y select line 128.

The main deflection voltage channel 2 includes a multichannel line 130 which leads to a D/A converter 132, the output of which is applied to filters 134 and 136. Switch 138 controlled by operator 114 may thus select any one of three filtered outputs of the D/A converter 132 for application to a summing amplifier 140. A ramp amplitude control channel 142 leads to a ramp generator 144 for generating trace timing. Generator 144 has an output which is applied by way of channel 146 to the second input of summing amplifier 140. The second input to the ramp generator 144 is a trigger pulse on line 142'.

A scan blanking pulse is applied to the converter 22 by way of channel 147 and OR gate 148. An intensity control signal is applied to the system on channel 150 where it is applied to a D/A converter 152 whose output is applied by way of channel 154 to the intensity control terminals on units 14 and 22.

A photographic camera control signal is applied by way of channel 160 to the record unit 14. A master blanking pulse is applied by way of channel 162 and OR gate 164 to the record unit 14. The master blanking pulse is also applied by way or OR gate 148 to the converter unit 22.

A section plot blanking pulse is applied by way of channel 166 and OR gate 164 to record unit 14. A format blanking signal is applied from the generator 26 to the control 11 by way of channel 168. An attenuation control voltage is applied into the attenuator unit 54 by way of channels 170. A trace polarity selector voltage is applied by way of channel 172 to the attenuator unit 54.

A monitor blanking pulse is applied by way of channel 174 to an OR gate 176 to the scan converter 22 and the monitor screen unit 178. An erase control is applied by way of channel 180 to the scan converter unit 22.

A TV raster generator 184 applies a raster to the scan converter 22. The converter 22 applies video signals by way of channel 186 to the monitor screen unit 178.

Figure 4:
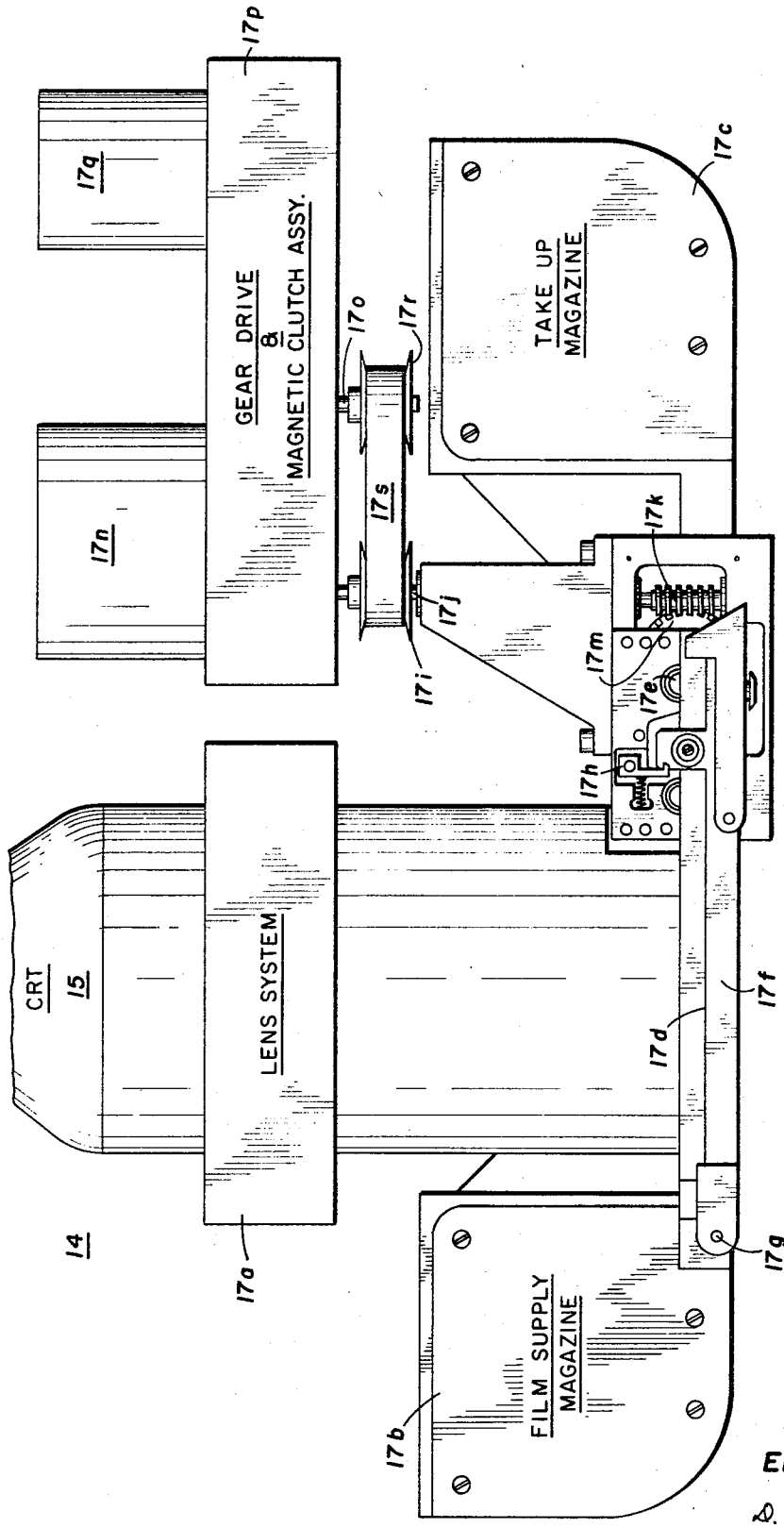
FIG. 4 illustrates the permanent recording of information displayed on the high resolution cathode ray tube.

FIG. 14 illustrates a top view of a portion of the recording system 14 and, more particularly, the cathode ray tube 15 and the camera 17. In the embodiment illustrated in FIG. 4 the cathode ray tube 15 is a high resolution tube having a diameter of about 5 inches. The lens assembly 17a of the camera 17 is mounted to view the face of the tube 15. The camera 17 is provided with a film supply magazine 17b and a film takeup magazine 17c. Film from magazine 17b moves along an image plane 17d under the control of a set of power driven rollers including a roller mounted on shaft 17e. The camera is provided with a door 17f hinged at point 17g to facilitate initial loading of the film. The door 17f has a spring-loaded latch 17h and is formed to maintain the film compartment light tight when closed. The advance mechanism for the film includes a precision drive including a pulley 17i mounted on shaft 17j. A worm gear 17k on shaft 17i is provided to drive a gear 17m to move the film. The system is set up to move the film, with precision, in steps of 0.001 inch per step under the control of a stepping motor 17n. The motor 17n is coupled to an output shaft 17o of a gear drive and magnetic clutch assembly 17p. A second motor 17q is provided for rapidly advancing the film a full frame at a time. The shaft 17o is provided with a pulley 17r which is coupled by belt 17s to pulley 17i.

In operation, each time stepper motor 17n is energized the film will advance 0.001 inch. The motor 17n will be energized in synchronism with the writing of separate traces on the tube 15 to advance the film at the end of each trace and before the next trace is started.

In contrast, the film in the camera 17 may be held in fixed position while a seismic record section comprising many traces is completely written on the tube 15 with the successive traces being spaced apart under the control of suitable stair-stepped bias voltages on the deflection control system. At the end of such an operation, then motor 17q may be energized to advance the film rapidly to provide a new frame in the camera. Alternatively, the system may be operated with combinations of the two different sets of controls. For example, a set of twenty-four traces may be written on the tube 15 with deflection voltages being controlled for the proper spacing between the traces as they are successively written. Thereafter, a series of twenty-four pulses would be applied to the motor 17n to advance the film a distance equal to that occupied by the twenty-four traces, whereupon a second set of twenty-four traces could be written adjacent to the first set.

It should be appreciated that the specific numbers of traces involved will depend on the recording system employed. In the present case reference was made to twenty-four traces because 24-trace recording systems are widely used.

In one embodiment of the system above described, the scan converter 22 was a duo-gun high resolution cathode ray tube with simultaneous write and read capability and was of the type CK-1383 manufactured and sold by Raytheon of Newton, Mass.

The recording units 15 and 16 used high resolution cathode ray tubes, 5 inches dia./40°, part No. L-4123 with P-11 phosphor, manufactured and sold by Litton Industries of San Carlos, Calif. This tube employed a spot of diameter less than 0.0015 inch over a screen diameter of 4.25 inches.

It will be apparent that, by application of suitable sweep pulses in the X and Y directions, timing lines, grid lines, and curves may be written on the high resolution cathode tubes 15 and 16, as well as the multi-trace seismic record sections.

The cameras 17 and 18 employed a lens as manufactured by Elgeet Optical Co. of Rochester, N.Y., and identified as No. CRT5–8612–1.

By utilization of the symbol generator 20, annotation symbols are applied to selected locations on the face of the units 15 and 16. The sizes of such symbols are controlled by suitable code on channel 72.

The symbol generator 20 employed a cathode ray tube 5 inches dia./16° manufactured and sold by Sylvania Electronic Products, Inc., Industrial and Miliary CRT Dept., Seneca Falls, N.Y., and identified by part No. SC–3168 with P–16 phosphor. A mask 37, FIG. 1, placed in front of the tube has 256 symbols including the numerals, the alphabet in upper and lower case, and other desired symbols. A lens 20b was employed for focusing the illuminated symbol on the mask 37 onto a photomultiplier tube. The lens was part No. CRT5–8013–.5 manufactured and sold by Elgeet Optical Co. and the photomultiplier tube was part No. 6292 manufactured and sold by Fairchild, DuMont Laboratories of Clifton, N.J.

The flying spot scanner operates by positioning the beam at one corner, for example, of a desired symbol to be generated and thereafter, a raster-type sweep is carried out. The raster is generated at the rate of 10 kilocycles for writing symbols at that rate. The output of the lens photomultiplier system 20b is applied to the recording unit to modulate, in black and white format, the selected symbol in synchronism with the raster generated by the unit 74. The lens system 20b operates in conjunction with a photomultiplier to produce output pulses synchronized with the raster generated by unit 74.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a seismic data processing system wherein signals in digital form representing a plurality of traces are to be processed and the processed traces are to be permanently recorded in conjunction with legends pertinent to said processed traces for subsequent display and analysis, the combination which comprises:
   (a) a computer having means for receiving seismic signals sampled at about one millisecond real time intervals and for processing said samples and producing flow of the processed samples on a computer channel at a rate of the order of from 16,000 to 32,000 processed samples per second,
   (b) a recording unit including a high resolution cathode ray tube and a camera disposed to record the data thereon at the precision of said tube,
   (c) annotation signal generating means to produce symbol containing rasters in response to said computer,
   (d) a seismic format generator connected between said tube and said output channel for receiving said digitized seismic trace data at said computer data rate and for applying said seismic trace data to activate said tube at said rate and including means to convert said digitized seismic trace data to first analog signals,
   (e) switching means operable in a first state for applying said analog signals to said tube, and operable in a second state for applying said rasters to said tube, and
   (f) control channel mode selector means energized by an output from said computer for setting said switching means in said first state to write said analog signals on said tube as side by side traces sequentially and for setting said switch in said second state to write symbols contained in said rasters on said tube in intervals between the end of one train of analog signals representing one seismic trace and the beginning of a succeeding train of analog signals representing the next seismic trace.

2. The combination set forth in claim 1 wherein said control channel includes:
   a first deflection control channel means extending from said computer and includes (i) a ramp voltage generator responsive to a computer generated trigger and ramp amplitude voltages to produce a first component of an analog tube deflection voltage and (ii) a D/A converter responsive to a beam index digital voltage to produce a second component of a tube deflection voltage and (iii) means to sum said first and second components to produce a second analog signal,
   a second deflection control channel extending from said computer and including a D/A converter responsive to a seismic time sweep signal to produce a third analog signal, and
   means to apply said third analog signal with said first analog signals to said tube to display said first analog signals along one coordinate of the field viewed by said camera and for applying said second analog signal to said tube to vary the position along a second coordinate of said display.

3. The combination set forth in claim 1 wherein raster generation means coupled to said cathode ray tube and to said annotation signal generating means serves to display symbols on said cathode ray tube in response to symbol selection command signals from said computer.

4. The combination set forth in claim 1 wherein control circuit means apply x–y beam coordinate control signals to said tube from said computer independently of said format generator and selector means interconnect said computer and said format generator for selectively blanking the output of said format generator for either simultaneous application of said analog signals and said x–y beam coordinate control signals to said tube or the application of said beam coordinate signals only to said tube.

5. The combination set forth in claim 4 wherein said control circuit means includes means for generating a ramp sweep voltage for one of said x–y beam coordinate signals and a selector circuit responsive to said computer is connected to said control circuit means for selective interchange of said x–y coordinate control signals.

6. The combination set forth in claim 5 wherein means are provided for generating one of said beam coordinate control signals with higher resolution than the other beam coordinate control signal.

References Cited

UNITED STATES PATENTS

| | | | |
|---|---|---|---|
| 3,333,237 | 7/1967 | Chapman | 340—18 |
| 3,134,957 | 5/1964 | Foote et al. | |
| 3,182,308 | 5/1965 | Dutton et al. | 340—324.1 |
| 3,191,169 | 6/1965 | Shulman et al. | 340—324.1 |
| 3,260,887 | 7/1966 | Alexander et al. | 340—15.5 |
| 3,344,407 | 9/1967 | Koeijmans | 340—15.5 |
| 3,366,935 | 1/1968 | Anderson | 340—324 |

THOMAS B. HABECKER, Primary Examiner

M. M. CURTIS, Assistant Examiner

U.S. Cl. X.R.

340—15.5, 212